Oct. 17, 1967   A. GRANDINETTI ET AL   3,347,163
COMPOSITE PRINTING PLATE PROCESS

Filed Oct. 7, 1965

INVENTORS
ATTILIO GRANDINETTI
JEROME KUDERNA
BY
MORGAN, FINNEGAN, DURHAM & PINE

ATTORNEYS

United States Patent Office 3,347,163
Patented Oct. 17, 1967

3,347,163
COMPOSITE PRINTING PLATE PROCESS
Attilio Grandinetti, Villa Park, and Jerome Kuderna, Oak Park, Ill., assignors to Electrographic Corporation, New York, N.Y., a corporation of Delaware
Filed Oct. 7, 1965, Ser. No. 493,754
1 Claim. (Cl. 101—401.1)

ABSTRACT OF THE DISCLOSURE

A process for forming an electrotype shell into a composite arcuate printing plate for use on a rotary letterpress printing press. The back side edges of an electrotype shell are uniformly upturned to provide a tray with sidewalls which is filled and levelled with a powdered thermoplastic resinous material, preferably an acrylonitrile-butadiene-styrene resin. The powder resin is then covered with a sheet of a compatible thermoplastic resin and the tray, powdered and sheet thermoplastic material preheated and thereafter subjected to pressure and heat so as to solidify the powdered resin, cause the sheet resin to flow laterally and to deform the sidewalls of the shell-tray. The tray and resin are then chilled under pressure, the backed shell trimmed and the exterior surface of the resin reheated. While still warm, the filled shell is machined to a uniform thickness, curved, and adhesively secured to the convex face of a rigid arcuate metal base by repeatedly subjecting the backed shell and base member to rolling pressure, starting from an intermediate portion of the shell and working alternately towards the ends of the shell.

---

The present invention relates to a novel and improved process for the formation of an electrotype shell into a composite arcuate printing plate to be used on a rotary letterpress printing press.

Objects and advantages of the invention will be set forth in part hereinafter and in part will be obvious herefrom, or may be learned by practice with the invention, the same being realized and attained by means of the instrumentalities and combinations pointed out in the appended claim.

The invention consists in the novel steps, combinations and improvements herein shown and described.

The accompanying drawings, referred to herein and constituting a part hereof, illustrate one embodiment of the invention, and together with the description, serve to explain the principles of the invention.

Figure 1:
FIGURE 1 is a fragmentary schematic sectional view of a conventional electrotype shell.
Figure 2:
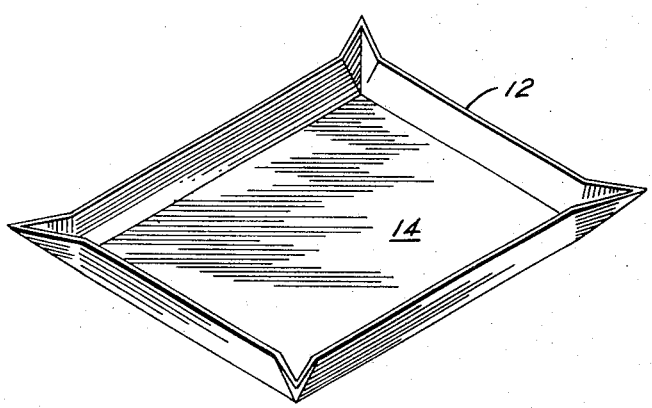
FIGURE 2 is a perspective view of the shell after its side edges have been turned up in accordance with the preferred embodiment of the present invention.

The present invention has for its object the provision of a novel and improved process for forming an electrotype shell into a composite printing plate for rotary letterpress printing, which composite printing plate is of exceedingly high printing quality, is economically produced and has exceedingly long press life. A further object is the provision of a process for forming a composite rotary letterpress printing plate, which is light in weight, can be operated for long press runs without danger of breakage or separation of the printing face from the backing member, and which can be manufactured to high standards of uniformity and in a preregistered condition.

Heretofore, many different processes have been proposed and tried out experimentally for the production of composite curved printing plates from electrotype shells, but these processes have proved to be unacceptable for various reasons when used for the production of high-quality magazine printing where long runs are involved, such as more than one million impressions from each plate. Other processes have proved to be uneconomical by reason of the high labor charge involved in their production, errors in the uniformity of the plates which have necessitated expensive, non-productive press-time to correct the errors, or the fact that the composite plates did not produce the required quality of printing, such as high quality of reproduction of type matter.

In its broadest aspects, the process of the present invention provides for the formation of a standard thin electrotype shell into an arcuate composite letterpress printing plate by surrounding the flat electrotype shell with a deformable rim, preferably by upturning the edges of the shell to provide an inclined rim of substantially uniform height. The space between the rim surrounding the shell is filled with a surplus quantity of a finely powdered thermoplastic resin, such as nylon, an epoxy resin or more preferably an acrylonitrile-butadiene-styrene resin (hereinafter referred to as ABS). While the particle size of the powdered resin is not critical, it is advantageous to use a powdered resin which will pass through a #20 (U.S.) screen, and yet will be sufficiently coarse to prevent excessive drifting of the powder by wind-currents.

The excess powder overlying the electrotype shell is levelled and removed by drawing a straight edge across the rim surrounding the shell. Thereafter a relatively thin sheet of compatible thermoplastic resin is laid over the powdered resin, the sheet of resin substantially covering the area within the deformable rim.

Thereafter, the flat shell with the overlying powder and resin sheet are transferred to the heated platen of a press, preferably a hydraulic press capable of exerting rather heavy pressures and having heated upper and lower flat parallel platens. While the lower platen is heated to a temperature of about 400° F. and the upper platen is heated to a temperature of about 350° F., the shell with its load of thermoplastic powder and overlying resin sheet, is supported on the lower platen with the upper platen spaced a small distance from the overlying sheet of thermoplastic resin. After a short period of time, usually about 1 or two minutes, the platens of the press are brought together with a presure of about 5 to 20 pounds per square inch exerted on the shell and plastic, and the heating of the shell and plastic is continued for a period of two or three minutes, after which the pressure between the platens of the press is increased to from 50 to 75 pounds per square inch and this pressure is continued for a period of from one to two minutes. The initial heating renders the plastic moldable, the second period of heating under pressure causes powdered plastic to become consolidated, with the removal of air from the spaces originally between the particles of the powdered plastic. At this time, the plastic sheet is also heated sufficiently to become moldable and so that it may be extruded sideways. When the pressure is increased, the entire plastic body on top of the shell is consolidated and firmly bonded to the shell, and is reduced to approximiately the thickness required for the backed shell prior to its being bonded to its eventual base layer.

The consolidated and compressed plastic layers on the shell are then removed from the heated hydraulic press and are transferred to a press having chilled platens, usually water-cooled. These platens are brought together so as to exert a low pressure between their flat surfaces on the shell and its plastic backing, thereby stabilizing the plastic material.

The chilled plastic backed shell is then trimmed to reduce the area to its desired rectangular shape of the desired dimensions.

Afterwards, the outer surface of the plastic shell-backing is heated by exposure to relatively intense infra-red radiation, as from a bank of infra-red lamps, so as to soften the outer layer of plastic material, thereby softening the plastic for subsequent machining and also flattening the plastic backed shell. After heating for a minute or two under the infra-red heater, the plastic backed shell is transferred to a milling cutter and is machined to the desired thickness.

Thereafter, and while the plastic layer is still somewhat warm and pliable, the machined back of the plastic layer is coated with a thin layer of a strong adhesive, preferably in the form of a sheet of adhesive formed of an acrylonitrile-rubber cement, which is preferably firmly adhered to the machined back of the plastic layer by passing the backed shell and plastic adhesive layer between pressure rollers, while the adhesive layer sheet is protected by means of a sheet of release paper. The release paper layer is removed, after which the adhesive coated plastic backing of the shell is positioned against the final, relatively rigid, curved backing member. This backing member is a relatively rigid arcuate metal member, preferably formed of a light metal such as an aluminum or magnesium metal or alloy, which is accurately curved to the desired dimension and has its convex surface cleaned so as to insure adherence of the plastic backed shell.

Preferably, the plastic backed shell has been registered, and this is usually accomplished by locating register marks on the surface of the plate with respect to punches, so that the marginal areas of the plate, on opposite sides of the shell may be punched with holes or slots, thereby insuring that the plate may be correctly registered on its base member.

The backing member is preheated to a temperature sufficiently high to insure bonding of the adhesive with the base member, the backed shell is provided with pins to extend through the register holes or slots and these pins are seated in similar holes in the base member. Thereafter, the plastic backed shell is positioned on the backing member, with the register pins holding the two members in a fixed position, after which the plastic backed shell and backing member are rolled together beginning at the central portion of the backed shell and backing member and oscillating from one side to the other until the entire area of the backed shell and backing member have been brought into contact with each other and consolidated. In such an operation the lower roller, bearing against the concave side of the base member is water cooled to improve adherence of the plastic backing to the base member.

As the curving of the backed shell is accomplished with a heated thermoplastic backing layer, curving does not in any way stretch or distort the printing surface of the electrotype shell, and accurate register of the printing face is maintained.

It is often advisable to coat the back face of the electrotype shell with a thin layer of a sprayed adhesive, such as an acrylonitrile-rubber cement, which is allowed to dry under mild heat, prior to the application thereto of the powdered thermoplastic resin. Likewise, the machined outer surface of the backed shell may be provided with a similar layer of sprayed acrylonitrile-rubber cement before being bonded to the curved base member.

Between the mass of powdered thermoplastic resin and the solid sheet of thermoplastic resin, it is usually advantageous to insert a sheet of an open weave coarse textile fabric, such as scrim, to allow for a more certain bleed of air from the powdered plastic, thereby insuring a more complete bond between the shell and the eventual backing or base member.

Referring now in detail to the accompanying drawings which show schematically the several steps of the process of the present invention as it is most preferably carried out in actual practice:

The electrotype shell 10 is a standard thin electrotype shell, formed by electrodeposition of copper on a conventional mould, the shell being flat and usually incorporating both type matter and line or halftone illustration. The shell is normally about 0.025" thick, not counting the raised type or pictorial areas, and may be provided with a nickel or chromium facing layer to improve its press-life.

In FIGURE 1, the shell is shown with its printing face at the lower side, and the back of the plate has an uneven surface which follows only approximately the configuration of the printing face.

The side edges of the flat shell 10 are turned up, either manually or by suitable mechanical means, at an angle of about 45° to form a rectangular tray 14, the side edges normally being about ¼ inch high. These upturned edges 12 strengthen the shell and assist in holding the face flat.

The interior of the tray is initially coated by brushing or spraying with a thin layer of a good adhesive, and where the tray is to be filled with acrylonitrile-butadiene-styrene resin, the adhesive is most preferably an acrylonitrile-rubber cement. After application, the adhesive is allowed to dry.

The hollow of the tray 14 is filled to overflowing with a finely granulated thermoplastic resin. Among the resins which are suitable are nylon, vinyl acetate-vinylchloride copolymer and acrylonitrile-butadiene-styrene (ABS). ABS is preferred, and the optimum ABS resin is manufactured by B. F. Goodrich Chemical Company and sold as "Abson 89127 Natural Powder 021." This powder is relatively fine having a particle size to pass through a #20 (U.S.) screen. The resin is preferably unfilled, but resins incorporating a filler may also be used.

Figure 3:
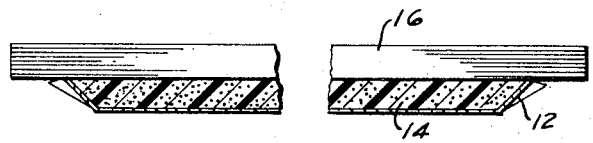
FIGURE 3 is a schematic view, in section, showing the levelling of the thermoplastic powdered resin which has been deposited on the back (upper) surface of the shell.
Figure 4:
FIGURE 4 is a similar view of the shell, its plastic powdered backing and an uppermost layer comprising a sheet of a compatible thermoplastic resin.
Figure 5:
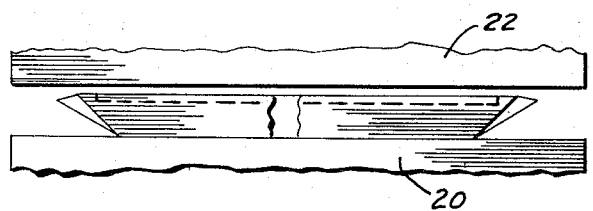
FIGURE 5 is a schematic sectional view showing the shell and its plastic backing being preheated between two heated platens of a hydraulic press.
Figure 6:
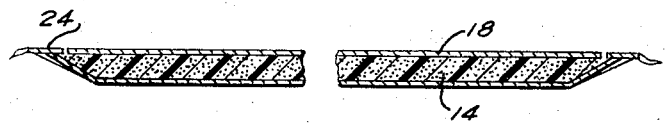
FIGURE 6 is a schematic sectional view showing the shell and plastic backing after they have been subjected to heat and pressure between the upper and lower flat heated platens of the hydraulic press.

A straight edge 16 is then drawn across the filled tray 14, supported by the side edges 12, thereby levelling the powder within the tray 14, as shown in FIGURE 3.

When the filled tray 14 has been levelled, a sheet of open-weave cloth, generally known as scrim and of the approximate dimensions of the tray 14 is laid on top of powder filling the tray. This serves to insure bleeding of the air within the filled tray as it is later heated, compressed and fused.

Thereafter, a sheet of compatible thermoplastic material 18, preferably the same ABS resin as forms the powder filling the tray 14, and of the same dimensions as the upper portion of the tray is laid over the powder and scrim, if used. This sheet of plastic is ordinarily from 0.030" to 0.040" thick.

The tray 14, filled with powdered plastic and covered with a sheet of solid compatible plastic 18 is then transferred to a heated press where it is allowed to rest on the lower heated platen 20, with the upper platen 22 spaced a short distance from the upper face of the sheet 18. This condition continues for a short time, such as 1 or 2 minutes, and in the case of ABS resin, the lower platen 20 is held at about 400° F. while the upper platen 22 is held at about 350° F.

When the powder filling tray 14 has been thoroughly preheated, the upper platen 22 is lowered into contact with the sheet 18, and pressure is applied to the filled shell at about 20 to 40 p.s.i., for a period of from 1 to 3 minutes. This serves to increase the heat on the plastic filling and the sheet 18, and causes the powder to fuse while the air between the plastic particles is allowed to bleed out.

Thereafter, the pressure exerted by the platens is increased to about 60 p.s.i., or from 3 to 5 tons for a 10″ x 15″ plate and this pressure is continued for about one minute. During the time that this heavier pressure is applied, the fused powder is further compacted, the side walls 12 are deformed and the sheet plastic 18 is extruded laterally as at 24, at the same time it is firmly bonded to the plastic filling in the tray 14.

For convenience, the shell is preferably underlaid with a sheet of release paper, and the upper face of the plastic sheet 18 is overlaid with a sheet of kraft paper before the filled shell 14 is put in the heated press.

In its uncompressed condition, the shell, powdered plastic filling and sheet 18 had an overall thickness of about 0.300″, after compression, the backed shell has a thickness of about 0.200″.

Figure 7:
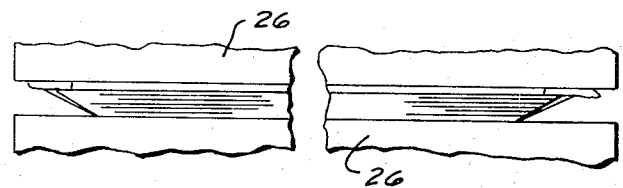
FIGURE 7 is a schematic sectional view showing the shell and plastic backing compressed between the upper and lower chilled platens of a press.

The hot shell tray 14 filled with the hot consolidated plastic and covered on its upper face with a sheet of kraft paper is transferred to a cooling press, as shown in FIGURE 7. Here, the assembly is pressed between upper and lower water-cooled platens 26 which set the plastic material and insure that it is set in a flat condition.

Figure 8:
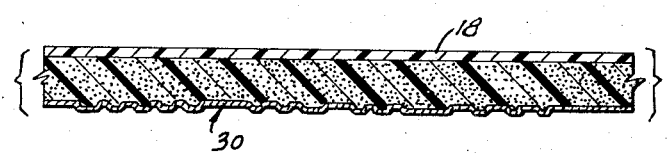
FIGURE 8 is a fragmentary sectional view showing the shell, consolidated plastic and plastic sheet after the assembly has been trimmed.

The cooled plate is removed from the press and is trimmed to the correct dimensions to provide a rectangular backed shell as shown in FIGURE 8.

The trimmed plate 30 is then placed face down under a bank of infra-red lamps which heat the kraft backing paper layer and plastic layer 18. When warmed, the plate is transferred to a plate shaving machine and is passed through the cutting mechanism to reduce the total thickness of the plate to about 0.060″ and to machine the back of the plate to a flat surface.

During the trimming operation, the surface of the plate is preferably provided with register marks near its opposite side edges, and is punched with master register holes or slots 32, so that a plate for one color may be easily and accurately registered with the other plates of the color set.

The still warm, backed electrotype shell which has been trimmed and provided with registering slots 32, is then positioned on the convex surface of a rigid light-weight metal particylindrical backing member 34, which usually extends for about 85° to 88° when four composite plates are to be mounted circumferentially of a printing cylinder. The backing member 34 is preferably formed with accurately curved cylindrical surfaces on its inner and outer faces, and is preferably made of a strong aluminum alloy, or sometimes of a magnesium alloy where the added cost can be economically justified by its lower weight. Ordinarily, the backing member has a thickness of about 0.110″, which with a backed shell of a thickness of 0.060″ provides a printing plate having a total thickness of 0.170″.

The light-weight metal backing member 34 is cleaned to provide a clean surface on its exterior convex surface, and is heated to bring the temperature of the backing member to about 350° F.

The shaved or machined back surface of the backed electrotype shell 30 is then provided with a layer 36 of an adhesive either by brushing, spraying or most preferably as a solid layer. If applied as a solid layer, the sheet of adhesive is preferably supported on a temporary release sheet, so that it may be adhered to the back of the backed shell, after which the support sheet may be stripped off and discarded.

The adhesively backed, plastic backed electrotype shell is then positioned on the rigid curved backing member 34, and is located thereon by pins 38 which extend through the register slots 32 in the backed shell and through corresponding holes in the backing member 34.

Figure 9:
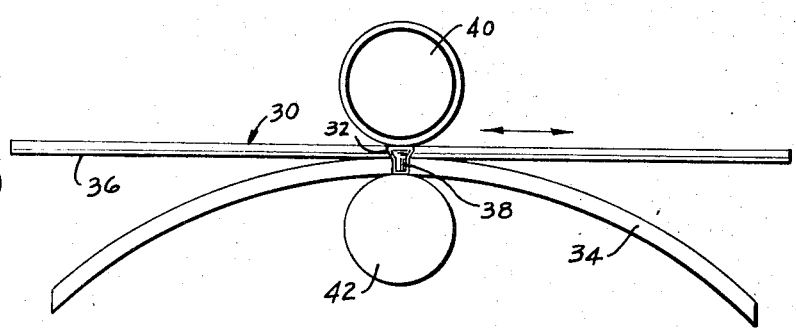
FIGURE 9 is a schematic view, partly sectional showing the initial stage in the lamination of the flat plastic backed shell to a curved rigid arcuate backing member.

With the shaved or machined backed shell 30 and the backing member in the relationship shown in FIGURE 9, and pressed together between pressure rollers 40 and 42, these rollers are repeatedly oscillated to bend the backed shell 30 and to adhere it firmly to the convex surface of the backing member. Preferably, roller 42 is water-cooled so as to cause the adhesive between the backed shell 30 and the base 34 to become set.

This lamination of the backed shell to the base member 34, and the apparatus therefor are more fully described in the copending application of Grandinetti, Burns and Furry Ser. No. 424,066 filed Jan. 7, 1965.

Figure 10:
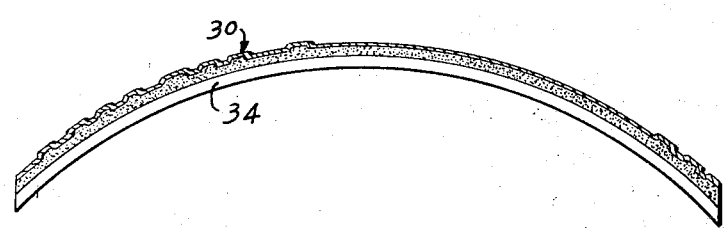
FIGURE 10 is a schematic view, in section, showing the finished composite printing member of the present invention.

When the adhesive layer has fully set, the mounted, backed shell, as shown in FIGURE 10 may be removed from the laminating press and is ready to be plated on the cylinder of a rotary letter press printing unit, and due to the preregistering of the plate, accurate register of the plate on the cylinder, relative to the other plates of a color set is readily accomplished.

The invention in its broader aspects is not limited to the specific steps shown and described but departures may be made therefrom within the scope of the accompanying claim without departing from the principles of the invention and without sacrificing its chief advantages.

What is claimed is:

The process of forming an electrotype shell into a composite arcuate printing plate which comprises surrounding an electrotype shell with a deformable rim, filling the space within the rim with a powdered thermoplastic resinous material, levelling the powder within the rim, covering the powder with a sheet of a compatible thermoplastic resin, preheating the shell, powder and sheet resin, subjecting the shell and resin to an initial pressure between flat heated surfaces to fuse the powdered resin, subjecting the shell and resin to an increased pressure to cause the resinous sheet to flow laterally against the restraint of the deformable rim, chilling the shell and resin filling under pressure, trimming the backed shell, reheating the exterior surface of the resin, machining the filled shell to a uniform thickness, curving and adhesively securing the heat-softened backed shell to the convex surface of a rigid arcuate metal base under heat and pressure, by repeatedly subjecting the backed shell and base member to rolling pressure, starting from an intermediate portion of the shell and working alternately towards the ends of the shell, and cooling the backed shell and base member.

References Cited

UNITED STATES PATENTS

| | | | |
|---|---|---|---|
| 2,114,288 | 4/1938 | Davis. | |
| 2,558,269 | 6/1951 | Reilly | 101—401.1 |
| 2,789,500 | 4/1957 | Reilly | 101—401.1 |
| 2,812,549 | 11/1957 | Wall. | |
| 3,145,654 | 8/1964 | Johnson et al. | 101—401.1 |
| 3,211,091 | 10/1965 | Garrett | 101—401.1 |

ROBERT E. PULFREY, *Primary Examiner.*

J. A. BELL, *Assistant Examiner.*